Sept. 14, 1954 W. A. GIGER 2,688,937
TORQUE TRANSMISSION ARRANGEMENT FOR RAILWAY VEHICLES
Filed July 28, 1949 3 Sheets-Sheet 1
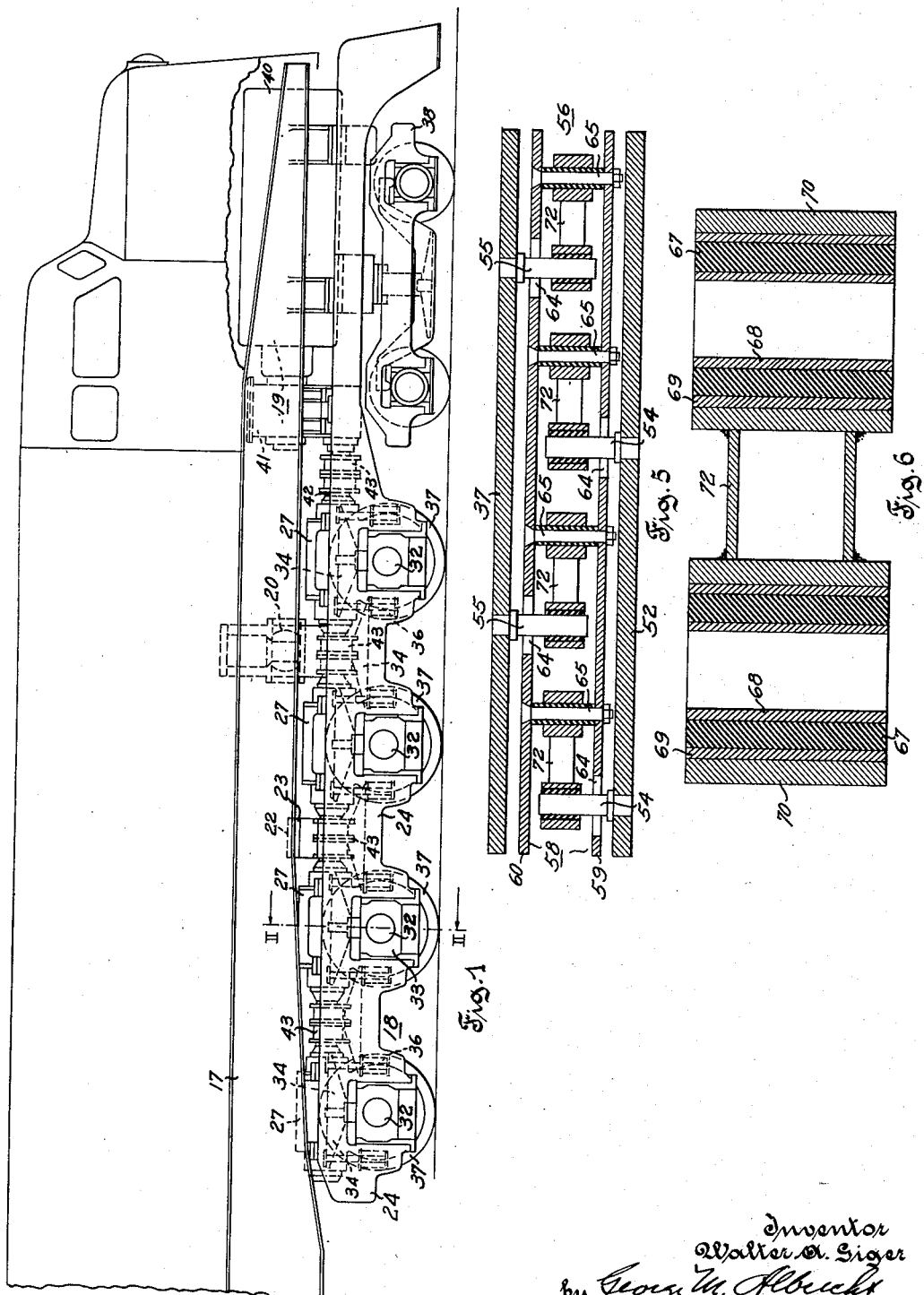
Inventor
Walter A. Giger
by George M. Albrecht
Attorney

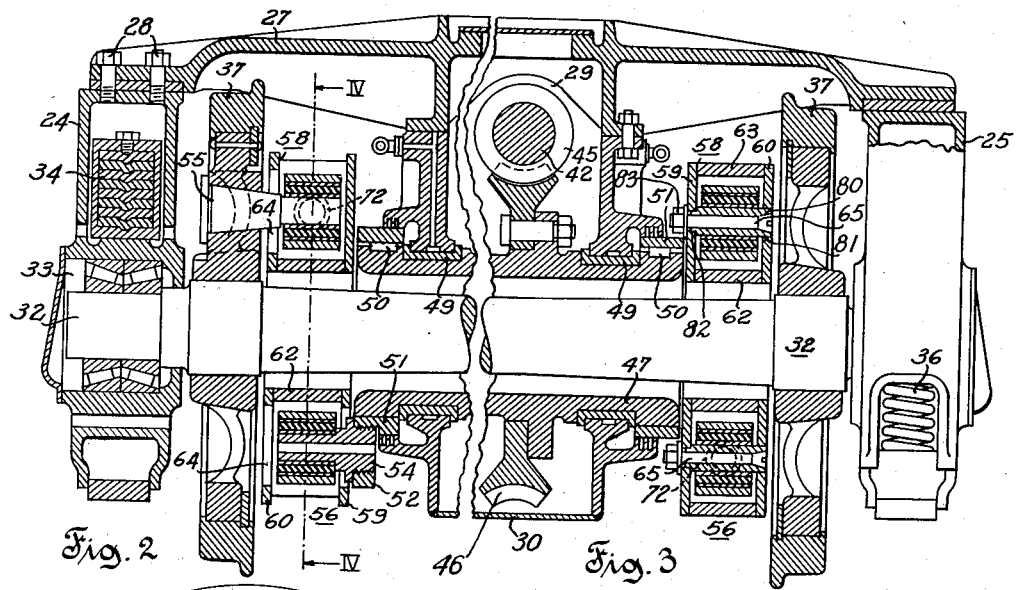
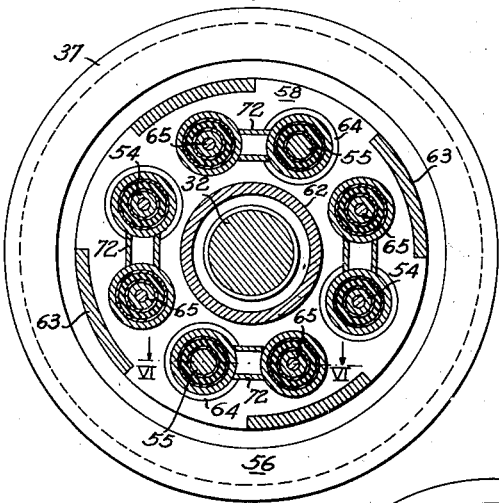
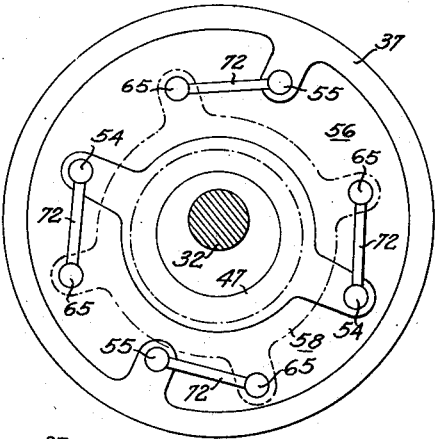
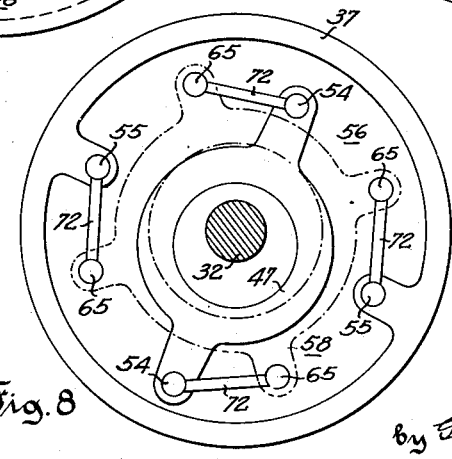

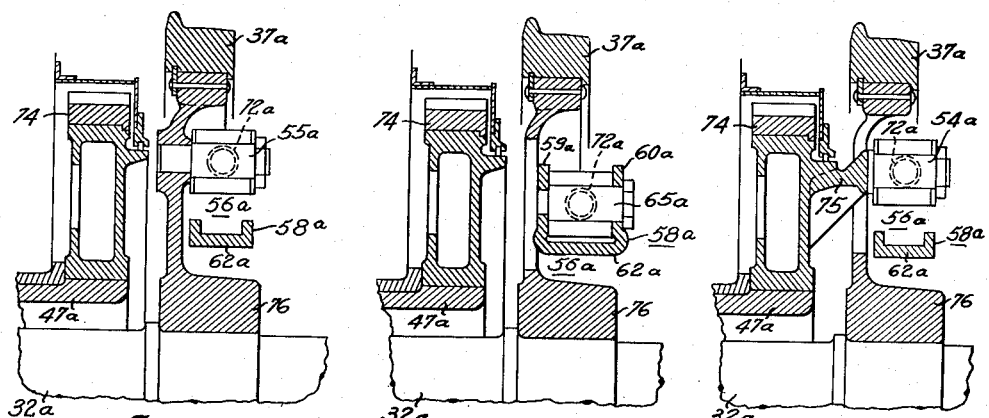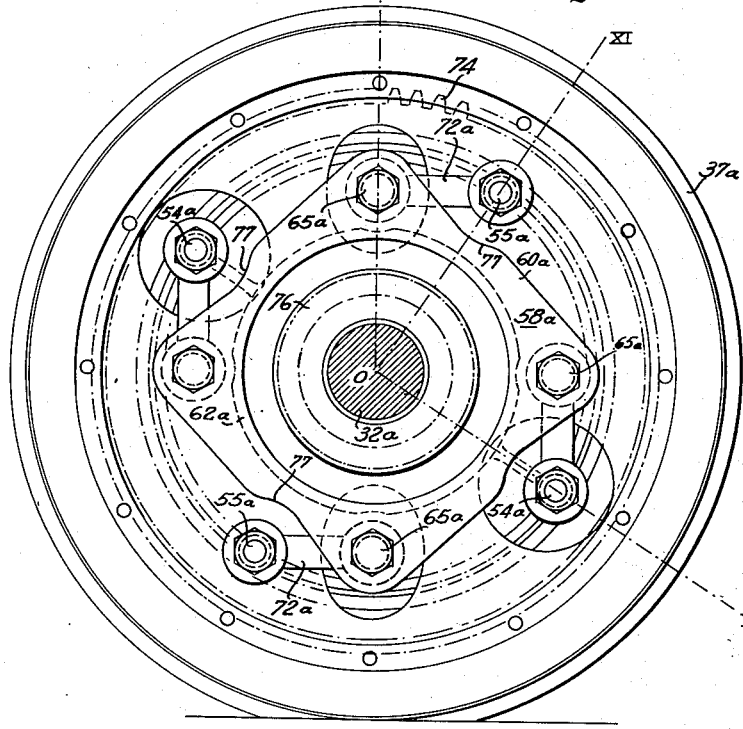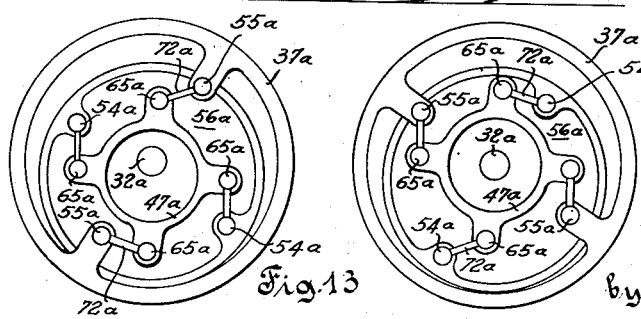

Patented Sept. 14, 1954

2,688,937

UNITED STATES PATENT OFFICE 2,688,937

TORQUE TRANSMISSION ARRANGEMENT FOR RAILWAY VEHICLES

Walter A. Giger, Milwaukee, Wis., assignor to Allis-Chalmers Manufacturing Company, Milwaukee, Wis., a corporation of Delaware Application July 28, 1949, Serial No. 107,195

2 Claims. (Cl. 105—131)

This invention relates to railway vehicles, and more specifically to a torque transmission arrangement with universal individual axle drives, and the principal object of the invention is to provide new and improved vehicles of these types.

Heretofore arrangements in use employing universal individual axle drives, were too complicated to be practically adapted for the available space permitted on railway vehicles. Also most of the individual axle drives included some kind of spring system in transmitting the motor torque from the reduction gears to the vehicle wheel. This presented the serious disadvantage that when full torque was applied to the drive, the springs were nearly fully compressed and hence would not permit the vehicle driving wheel to move freely up and down within the designed limits of the vertical axle play. Other drives in existence were constructed with metal bearings, such as for example the ball and socket type, which necessarily required some kind of lubrication to prevent excessive wear and assure efficient operation. Where oil was used as the lubricant, it was necessary to enclose the movable contacting parts of the drive in an oil tight housing. This was impractical since it was nearly impossible to keep such oil housings tight, and consequently the oil consumption was high, and dirt and dust entry into these housings was considerable. Hence not only was it costly but undesirable as well, since the oil that leaked from the housing was thrown on the vehicle running gear making it difficult to keep clean. Grease lubrication was also used; however the centrifugal force created during operation threw the grease out to result in no lubrication at all. Accordingly it is another object of the invention to provide means for obviating these undesirable features. Another major object of the invention is to provide a structure which will decrease the maintenance and increase the reliability of the vehicle.

A specific object of the invention is to provide a torque transmission assembly which is unaffected by the springing of a railway vehicle.

A more specific object of the invention is to provide a vehicle with a simple torque transmission assembly.

A still more specific object of the invention is the construction of an axle drive requiring no lubrication at all.

The novel features and how the objects of the invention are attained will appear from the specification and the accompanying drawings showing the invention and forming a part of this application, and all these novel features are intended to be pointed out in the claims.

In the drawings:

Fig. 1 is an elevational view of a part of a railway vehicle embodying the invention;

Fig. 2 is a central sectional view taken along line II—II of Fig. 1 through the wheel and quill pins, and showing only a portion of the starboard half from the center line;

Fig. 3 is a continuation of Fig. 2 showing the remaining portion of the sectional view omitted in Fig. 2, and the port half from the center line taken along line II—II of Fig. 1 through the cage bolts of a floating cage;

Fig. 4 is a cross sectional view of a universal drive coupling taken along line IV—IV of Fig. 2;

Fig. 5 is a diagrammatic development of the universal drive coupling;

Fig. 6 is an enlarged horizontal sectional view of the articulating link taken along line VI—VI of Fig. 4;

Figs. 7 and 8 are diagrammatic illustrations of the universal coupling and its component parts, at various vertical and rotational positions;

Fig. 9 is a side elevational view of a universal drive coupling used on railway vehicles with large diameter driving wheels;

Fig. 10 is a sectional view taken along line O—X of Fig. 9;

Fig. 11 is a sectional view taken along line O—XI of Fig. 9;

Fig. 12 is a sectional view taken along line O—XII of Fig. 9;

Figs. 13 and 14 are diagrammatic illustrations of the universal coupling shown in Fig. 9 at various vertical and rotational positions; and Fig. 15 is a general diagrammatic illustration of the driving elements for the universal drive coupling located on the journal box side of the vehicle.

In order to more clearly set forth the nature of the invention, only one-half of the railway vehicle is illustrated and hereinafter described.

Referring to Fig. 1, the railway vehicle shown is of the truck type and comprises generally a frame 17, a truck 18 and a longitudinal centrally arranged power transmission mechanism 19.

The frame 17 is supported in circumferential sliding relationship with respect to the truck 18 about a pivot 20, upon sliding members 22, 23 secured respectively to the frame and the truck.

Referring more particularly to Figs. 2 and 3, the truck 18 is characterized by side frames 24, 25 which are transversely spaced by yokes 27 rigidly fixed to the side frames in any suitable manner and as here shown by means of bolts 28. An integral portion of each yoke 27 includes a worm housing 29 forming a part of a gear casing 30 depending from intermediate the ends of the yoke 27. The truck 18 is provided with a plurality of driving axles 32, preferably as here shown with four, the ends of which are resiliently biased to the side frames 24, 25 in journal boxes 33 by means of coacting leaf springs 34 and coil springs 36. Inwardly adjacent the journal boxes 33 and rigidly secured to enlarged portions of the driving axles 32 are driving wheels 37 for driving the vehicle.

Secured to one end of the truck 18 directly above a guiding truck 38, is a traction motor 40 energized by a prime mover (not shown). A gear reduction box 41 transfers the driving torque developed to a longitudinal shaft, centrally located between the side frames 24, 25 above the springs 34, 36 in the truck 18. The longitudinal shaft substantially comprises shaft sections 42 connected by means of flexible couplings 43. Intermediate the ends of each shaft section 42 is a worm 45, comprising with a worm wheel 46, secured to a quill 47, right angle gears in meshing engagement within the gear casing 30. The quill 47 is normally concentrically spaced about the driving axle 32, and rotatably mounted in bearings 49 through the gear casing 30. Fastened to the outer ends of the quill 47 by means of a key 50, is a ring 51 provided with radial outwardly extended arms 52, for receiving quill pins 54 projecting outwardly substantially parallel to the axis of rotation of the driving wheels and driven quill. Similarly arranged, but in an inwardly projected manner, are wheel pins 55, rigidly secured to the driving wheels 37.

Interposed between each end of the quill 47 and the driving wheels 37 is a universal driving coupling 56 comprising a floating cage 58 formed by inner and outer apertured plates 59 and 60, respectively, rigidly spaced apart by a hollow cylindrical hub 62 and arcuate members 63. Annular openings 64 in the plates 59, 60 are provided to allow a portion of the quill and wheel pins 54, 55, respectively, to protrude into the interior of the floating cage 58, and sufficiently large to permit access for the removal and replacement of worn parts or for other reasons. Secured between the two plates 59, 60 are cage bolts 65 circumferentially spaced between the quill pins 54 and wheel pins 55. Firmly receivable on to the cage bolts 65 and the protruded portions of the pins 54, 55 in nonslipping relationship, are resilient means consisting of a rubber sleeve 67 vulcanized between two thin walled cylinders 68, 69. The inner cylinder 68 is held in nonslipping relationship with the pins 54, 55 and the cage bolts 65 in a press fitted manner. The outer cylinder 69 is received in a cylindrical hollow collar 70 functionally integral with the ends of articulating links 72, which drivingly interconnect the driven quill 47 with the driving wheels 37 through means of the floating cage 58.

Each of the bolts 65 is mounted within a sleeve 80. One end of the sleeve 80 extends freely through an opening 81 in the plate 60. The bolt 65 has an expanded portion on one end in complementary engagement with a recess in the free end of the sleeve 80. The bolt 65 has a threaded portion on the end opposite the expanded portion. The threaded portion of bolt 65 extends through an opening 82 in plate 59. The opening 82 is slightly larger than the bolt 65 but smaller than the outer diameter of sleeve 80. The bolt 65 and sleeve 80 are secured to plate 59 by a nut 83 engaging the threaded portion of bolt 65 that extends through plate 59. The bolts 65 are thereby supported on both ends by plates 59 and 60 but are secured only on one end to plate 59. When the bolts 65 are secured to plate 59, plate 60 will not be drawn toward plate 59 and no warping of the plates will be induced that would tend to bind the collars 70 of the links 72 between the plates. And, further, since plate 60 supports bolts 65 without being secured thereto a limited amount of flexing of plates 59, 60 resulting from structural vibrations can be accommodated without bending the bolts 65 sufficiently to bind with the collar assembly 70 of the links 72.

A great variety of universal driving couplings may be formed from the aforementioned structure. The universal driving coupling 56 here illustrated constitutes two pairs of connections, one of which interconnects the driven quill 47 with the floating cage 58 and the other pair the floating cage with the driving wheels 37. Each pair comprises normally disposed parallel articulating links 72, in such a manner that the opposite diagonal end of each pair is in pivotal cooperative relationship with the floating cage 58.

In actual operation, as the vehicle is driven over switches or other irregularities of the track sufficient to cause vertical displacement of the driving wheels 37 the driving axle 32 will be displaced proportionately within the travel limits of the resiliently biased journal boxes 33. Since the inner diameter of the quill 47 and the floating cage 58 is substantially greater than the diameter of the axle 32 thereby surrounded, free movement of the axle within the designed limits is permitted.

Fig. 7 shows the position the universal driving coupling 56 assumes when the set of links connecting the floating cage 58 with the quill 47 is in a vertical position at the time the driving wheel 37 is vertically displaced. At this instant the centers of the quill 47 and the floating cage 58 will remain in the same horizontal position as prior to the displacement of the wheel 37, due to the absorption of the vertical motion of the wheel by the links 72, interconnecting the wheel with the floating cage, in the converted form of angular motion. Hence it is obvious that the vertical displacement of the wheel 37 will not effect a transmission of motion to the floating cage 58 nor to the quill 47. In Fig. 8 the driving wheel 37 has rotated 90 degrees while in the vertically displaced position. It is now seen that the floating cage 58 must necessarily follow the vertical displacement of the driving wheel 37, and therefore the centers of the floating cage 58 and the driving wheel are again in the same horizontal plane but displaced vertically from their normal position. In both Figs. 7 and 8 the resilient means carried by the respective normally horizontal articulating links 72 are torsionally stressed to permit the links to take up the vertical displacement of the driving wheel 37. From the foregoing it is readily understood that the rubber sleeves 67 act as cushioning elements during the misalignments of the centers as described to such an extent that the transmission of motor torque remains uniform and the spring system, including leaf springs 34 and coil springs 36 of the vehicle is not at all affected.

It is also readily understood that the universal driving coupling 56 is operative without the use of any lubrication, since the only relative movable contacting elements are resilient particles constituting the rubber sleeves 67. Furthermore no protective housing is necessary for the resilient means since they are unaffected by dust, dirt or water.

It is further apparent from the general arrangement of this vehicle assembly, that most of the dead weight is removed from the driving axle 32. The term "dead weight" is herein used to designate that portion of the railway vehicle which is not springborne from the driving axles 32, such as for example the journal boxes 33 which are directly supported thereon. Hence the effects of blows created by irregularities of the track are damped by the springs 34, therefore lowering the effects thereof on the vehicle assembly. Equally apparent is that any unloading of the front drivers, due to the application of a tractive effort on the truck 13, is automatically compensated by an increased loading of the rear drivers, and hence no reduction in tractive effort takes place during starting, and the danger of slipping driving wheels 37 is greatly reduced.

Another embodiment of the invention is shown in Figs. 9–12, in which similar parts are given the same numerals with the suffix of small "a." The universal driving coupling 56a is disposed within the driving wheels 37a on the journal box side, and is therefore more or less restricted to larger diameter driving wheels, as for example 57 inches or larger in diameter. In this instance a quill 47a is driven by a set of spur gears 73 shown in Fig. 15. A gear 74 partially shown in Fig. 9 is rigidly secured to the quill 47a and is in meshing engagement with the two spur gears 73 which are driven by any suitable means (not shown). The quill 47a carries by means of gear 74 stud arms 75 to which are rigidly secured quill pins 54a which project outwardly between the spokes of the driving wheel 37a. Wheel pins 55a extend outwardly from the driving wheel 37a to which they are rigidly secured. The quill pins 54a and wheel pins 55a are alternately diametrically spaced apart and are normally located on circumferential lines having the same radii. A floating cage 58a is concentrically normally spaced about the hub 76 of the driving wheel 37a and substantially located within the wheel itself. The floating cage 58a comprises essentially square apertured plates 59a and 60a rigidly spaced apart by a hub 62a functionally integral therewith. Each plate 59a and 60a is provided with arcuate peripheral edges 77 to allow for the respective movement of the pins 54a and 55a, upon vertical displacement of the driving wheel 37a. Cage bolts 65a are rigidly fixed between the corners of the plates 59a and 60a and are interconnected to the driving wheel 37a and the quill 47a by means of articulating links 72a and resilient means, respectively, to the wheel pins 55a and quill pins 54a as previously described.

The operation of this embodiment of the invention is similar to that of the first embodiment, and therefore need not be further described. The elements, however, comprising this arrangement are more accessible and hence facilitate replacement of damaged or worn parts, and therefore preferred to the first arrangement whenever large diameter driving wheels are used.

From the preceding description it will be apparent to those skilled in the art that the illustrated embodiments of the invention provide a new and improved railway vehicle and accordingly accomplish the objects of the invention. It will also be obvious to those skilled in the art that the illustrated embodiments of the invention may be variously changed and modified, or features thereof, singly or collectively, embodied in other combinations than those illustrated without departing from the spirit of the invention, or sacrificing all of the advantages thereof, and that accordingly the disclosure herein is illustrative only and the invention is not limited thereto.

It is claimed and desired to secure by Letters Patent:

1. A railway vehicle comprising, a frame; a truck supporting said frame; a plurality of axles journaled in said truck; a plurality of wheels carried by said axles, at least one of said wheels being a driving wheel; a quill about the axle carrying said driving wheel, said quill being rotatably journaled in said truck; means for rotating said quill about said axle; a pair of apertured plates axially spaced from each other and radially spaced about the axle carrying said driving wheel; and at least four rigid torque transmitting links between said plates, said links having their one end pivotally connected respectively to bolts extending between said plates, a sleeve about each of said bolts, one end of said sleeve freely extending axially through an opening in one of said plates, each said bolt having an expanded portion on one end thereof in complementary engagement with a recess in said free end of said sleeve, each said bolt terminating in a threaded portion on the end opposite said expanded portion, said threaded portion extending through an opening in the other of said plates, said opening in said other plate being of less diameter than the outer diameter of said sleeve, and a threaded member for engagement with the threaded portion of said bolt extending through said other plate to secure said bolt and said sleeve to said other plate, said links having their other ends pivotally connected respectively to pins, two of said pins being diametrically positioned relative to each other and extending through respective openings in one of said plates for connection with said quill to transmit torque from said quill to said plates, and another two of said pins being diametrically positioned relative to each other and extending through respective openings in one of said plates for connection with said driving wheel to transmit said torque from said plates to said driving wheel.

2. A railway vehicle comprising, a frame; a truck supporting said frame; a plurality of axles journaled in said truck; a plurality of wheels carried by said axles, at least one of said wheels being a driving wheel; a quill about the axle carrying said driving wheel, said quill being rotatably journaled in said truck; means for rotating said quill about said axle; a pair of apertured plates between said quill and said driving wheel, said plates axially spaced from each other and radially spaced about the axle carrying said driving wheel; and at least four rigid torque transmitting links between said plates, said links having their one end pivotally connected respectively to bolts extending between said plates, a sleeve about each of said bolts, one end of said sleeve freely extending axially through an opening in one of said plates, each said bolt having an expanded portion on one end thereof in complementary engagement with a recess in said free end of said sleeve, each said bolt terminating in a threaded portion on the end opposite said expanded portion, said threaded portion extending through an opening in the other of said plates, said opening in said other plate being of less diameter than the outer diameter of said sleeve, and a threaded member for engagement with the threaded portion of said bolt extending through said other plate to secure said bolt and said sleeve to said other plate, said links having their other ends pivotally connected respectively to pins, two of said pins being diametrically positioned relative to each other and extending through respective openings in one of said plates for connection with said quill to transmit torque from said quill to said plates, and another two of said pins being diametrically positioned relative to each other and extending through respective openings in the other of said plates for connection with said driving wheel to transmit said torque from said plates to said driving wheel.

References Cited in the file of this patent

UNITED STATES PATENTS

| Number | Name | Date |
| --- | --- | --- |
| 1,055,598 | Balachowsky | Mar. 11, 1913 |
| 1,851,068 | Swabb | Mar. 29, 1932 |
| 1,984,958 | Barske | Dec. 18, 1934 |
| 2,299,099 | Ledwinka et al. | Oct. 20, 1942 |
| 2,385,642 | Peterson | Sept. 25, 1945 |
| 2,527,281 | Varcoe | Oct. 24, 1950 |

FOREIGN PATENTS

| Number | Country | Date |
| --- | --- | --- |
| 732,466 | France | June 14, 1932 |
| 844,968 | France | May 1, 1939 |
| 295,224 | Germany | Nov. 13, 1916 |
| 14,996 of 1887 | Great Britain | Nov. 3, 1887 |